(12) United States Patent
Rauschenbach et al.

(10) Patent No.: US 7,950,209 B2
(45) Date of Patent: May 31, 2011

(54) DRIVE ARRANGEMENT FOR AN AGRICULTURAL MACHINE

(75) Inventors: Stefan Rauschenbach, Grosspostwitz (DE); Andreas Roth, Neunkirchen-Seelscheid (DE); Maik Sterzel, Kubschutz (DE); Thomas I. Strobel, Stolpen/Langenwohnsdorf (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 12/503,292

(22) Filed: Jul. 15, 2009

(65) Prior Publication Data

US 2010/0011727 A1 Jan. 21, 2010

(30) Foreign Application Priority Data

Jul. 18, 2008 (DE) .......................... 10 2008 033 918

(51) Int. Cl.
*A01D 69/00* (2006.01)
*A01D 43/00* (2006.01)
(52) U.S. Cl. ...................................................... 56/11.8
(58) Field of Classification Search .... 56/10.2 A–10.2 J, 56/10.2 R, 10.5, 10.8, 10.9, 11.1, 11.3, 11.9, 56/13.5, 11.8, 14.5, 51, 219, 15.1, 16.7; 460/6, 460/1–3; 60/489, 494; 280/492, 493, 494; 241/101.742, 101.763, 186.3, 222–224, 185.5
See application file for complete search history.

(56) References Cited

U.S. PATENT DOCUMENTS

| | | | | |
|---|---|---|---|---|
| 5,657,621 A | * | 8/1997 | Mendes et al. | 56/16.4 D |
| 6,247,296 B1 | * | 6/2001 | Becker et al. | 56/11.2 |
| 6,425,232 B1 | * | 7/2002 | Desnijder et al. | 56/16.4 B |
| 6,625,964 B2 | * | 9/2003 | McLeod et al. | 56/11.9 |
| 7,219,487 B2 | * | 5/2007 | Ameye | 56/10.2 H |
| 7,464,525 B2 | * | 12/2008 | Dueckinghaus et al. | 56/10.2 J |

FOREIGN PATENT DOCUMENTS

DE 196 06 388 8/1997
DE 10 2006 030 971 A1 1/2008

* cited by examiner

*Primary Examiner* — Robert E Pezzuto
(74) *Attorney, Agent, or Firm* — Harness, Dickey & Pierce, P.L.C.

(57) ABSTRACT

A drive arrangement for an agricultural machine, especially a field chopper, has a motor driven gearbox (3) that is connectable at a drive-end to at least one drive motor (1). At least one first hydraulic pump (8, 8') is provided to feed at least one hydraulic motor (14), (17) to drive a working mechanism of a machine. A belt pulley (4) of a belt drive (5), especially for driving a chopper drum (10), is coupled with the gearbox (3). A release clutch (7), with an input-side first clutch element (36) and an output-side second clutch element (37), is also coupled with the gearbox (3). The first clutch element (36) is drivingly connected to the motor driven gearbox (3). The second clutch element (37) is drivingly connected to the belt pulley (4). The second clutch element (37) is non-rotationally connected to a drive shaft (38) to drive the at least one first hydraulic pump (8, 8').

7 Claims, 2 Drawing Sheets

DRIVE ARRANGEMENT FOR AN AGRICULTURAL MACHINE

CROSS-REFERENCE TO RELATED APPLICATION

This application claims priority to German Patent Application No. 102008033918.0 filed Jul. 18, 2008, which application is herein expressly incorporated by reference.

FIELD

The disclosure relates to a drive arrangement for an agricultural machine, especially for a field chopper. The drive arrangement drives a main aggregate, especially a chopper drum, as well as a working mechanism, as for example a header and/or an intake unit.

BACKGROUND

DE 10 2006 030 971 A1 illustrates a drive arrangement for a field chopper. When seen in a driving direction, the field chopper has, at its front, a cutting section for cutting the harvested goods, as for example grass or corn. A header is arranged behind the cutting section. The header picks up the harvested goods and guides them centrally together. The goods are guided by an intake unit with a roller unit to the chopper drum. The chopper drum shreds the harvested goods. A cracking device to break up the grain is provided following the chopper drum. The chopper drum transports the harvested goods to an acceleration unit. The acceleration unit delivers the harvested goods through an ejection channel to the outside. Thus, the harvested goods can be passed onto a loading vehicle.

The drive arrangement of the field chopper includes a drive motor that is connected in a driving manner to a motor driven gearbox. The motor driven gearbox drives a belt pulley of a belt drive. The chopper drum is driven by the belt drive. Beside the chopper drum, a hydraulic pump is also driven by the belt drive. The hydraulic pump drives a hydraulic motor. The hydraulic motor drives the roller unit of the intake unit. Furthermore, the chopper is connected to a further belt drive to drive the header.

SUMMARY

It is an object of the present disclosure to provide a drive unit to drive a main aggregate and at least a further working mechanism, especially a field chopper, that has a compact structure.

The object is solved by a drive arrangement for an agricultural machine, especially for a field chopper, that comprises a motor driven gearbox connectable at the drive-end to at least one drive motor. At least one first hydraulic pump feeds the at least one hydraulic motor to drive the working mechanism of the machine. A belt pulley of a belt drive drives a chopper drum as well as a release clutch. The release clutch has an input-side first clutch element and an output-side second clutch element. The first clutch element is drivingly connected to the motor driven gearbox. The second clutch element is drivingly connected to the belt pulley. The second clutch element is non-rotationally connected to a drive shaft to drive the at least one first hydraulic pump.

The second clutch element is non-rotationally connected to the drive shaft to drive the at least one first hydraulic pump. This ensures that the first hydraulic pump is directly driven by the motor driven gearbox without an interconnection to a belt drive. Thus, the first hydraulic pump can be arranged in direct proximity to the motor driven gearbox. The first hydraulic pump is provided in the area of the belt drive where generally restricted space conditions exist. Furthermore, the wear at the belt drive is reduced since it does not drive the first hydraulic pump.

The first hydraulic pump is driven by the second clutch element of the release clutch. When the release clutch is released, switching-off the belt drive, the first hydraulic pump is no longer driven. Thus, in comparison to solutions where hydraulic pumps are constantly driven by the drive motor, a lower energy demand is achieved when the present chopper unit is used. When the belt drive is switched-off, the belt drive or the chopper drum is decelerated by the idling of the first hydraulic pump and the idling of the first hydraulic motor. To amplify this effect, the hydraulic connection between the first hydraulic pump and the first hydraulic motor can be interrupted. Thus, the chopper drum can be decelerated against the force of the first hydraulic motor. This can also be achieved by hydraulically short-circuiting the first hydraulic motor.

An output shaft is rigidly connected to the first clutch element to connect the motor driven gearbox in a driven manner.

The second clutch element can be directly connected in a non-rotational manner to the belt pulley. In this case, the drive shaft for driving the first hydraulic pump is directly connected to the belt pulley. The drive shaft can, in this case, be connected by a toothed step wheel to the hydraulic pump.

A control valve arrangement is provided to connect the at least one first hydraulic pump to the at least one hydraulic motor. Thus, the different switching positions can be achieved to decelerate for example, as already mentioned, the chopper drum against the first hydraulic pump.

Preferably, the drive arrangement includes at least one second hydraulic pump. The at least one second hydraulic pump is connected, via the control valve arrangement, to the at least one first hydraulic pump. The at least one first hydraulic pump and the at least one second hydraulic pump are hydraulically separated from each other in the first switching position of the control valve arrangement with the release clutch engaged. The at least one first hydraulic pump and the belt pulley are driven by the at least one drive motor in a main direction of rotation. The at least one first hydraulic pump is hydraulically connected to the at least one second hydraulic pump in a second switching position of the control valve arrangement when the release clutch is released. The at least one first hydraulic pump is operated as a hydraulic motor to drive the belt pulley. The at least one first hydraulic pump is driven by the at least one second hydraulic pump in a direction of rotation opposite to the main rotational direction.

In this arrangement, the first hydraulic pump is driven, depending on the switching position of the switching valve arrangement, as a hydraulic pump or a hydraulic motor. The first hydraulic pump is used as a hydraulic pump during normal driving conditions of the chopper drum. The first hydraulic pump hydraulically drives the further working mechanism, as for example the header or the intake unit. There are, however, applications, where it is required to drive the chopper drum in a reversed manner. A second hydraulic pump is driven via the motor driven gearbox by the drive motor to drive the chopper drum in a reverse manner. Via the control valve arrangement, the hydraulic connection between the first hydraulic pump and the first hydraulic motor is interrupted. Instead, a hydraulic connection is achieved between the first hydraulic pump and the second hydraulic pump. The second hydraulic pump drives the first hydraulic pump as a hydraulic motor. This takes place in the opposite direction to the main direction of rotation of the first hydraulic pump. Thus, the belt drive can be driven, when the release clutch is released, in a direction opposite to the main rotational direction. Accordingly, the chopper drum rotates in reverse.

Further areas of applicability will become apparent from the following description. The description and specific examples in this summary are intended for purposes of illustration only and are not intended to limit the scope of the present disclosure.

DRAWINGS

A preferred embodiment of the agricultural machine according to the disclosure is described in detail using the drawings.

DETAILED DESCRIPTION

A preferred embodiment of the present disclosure will be described with reference to the accompanying drawings.

Figure 1:
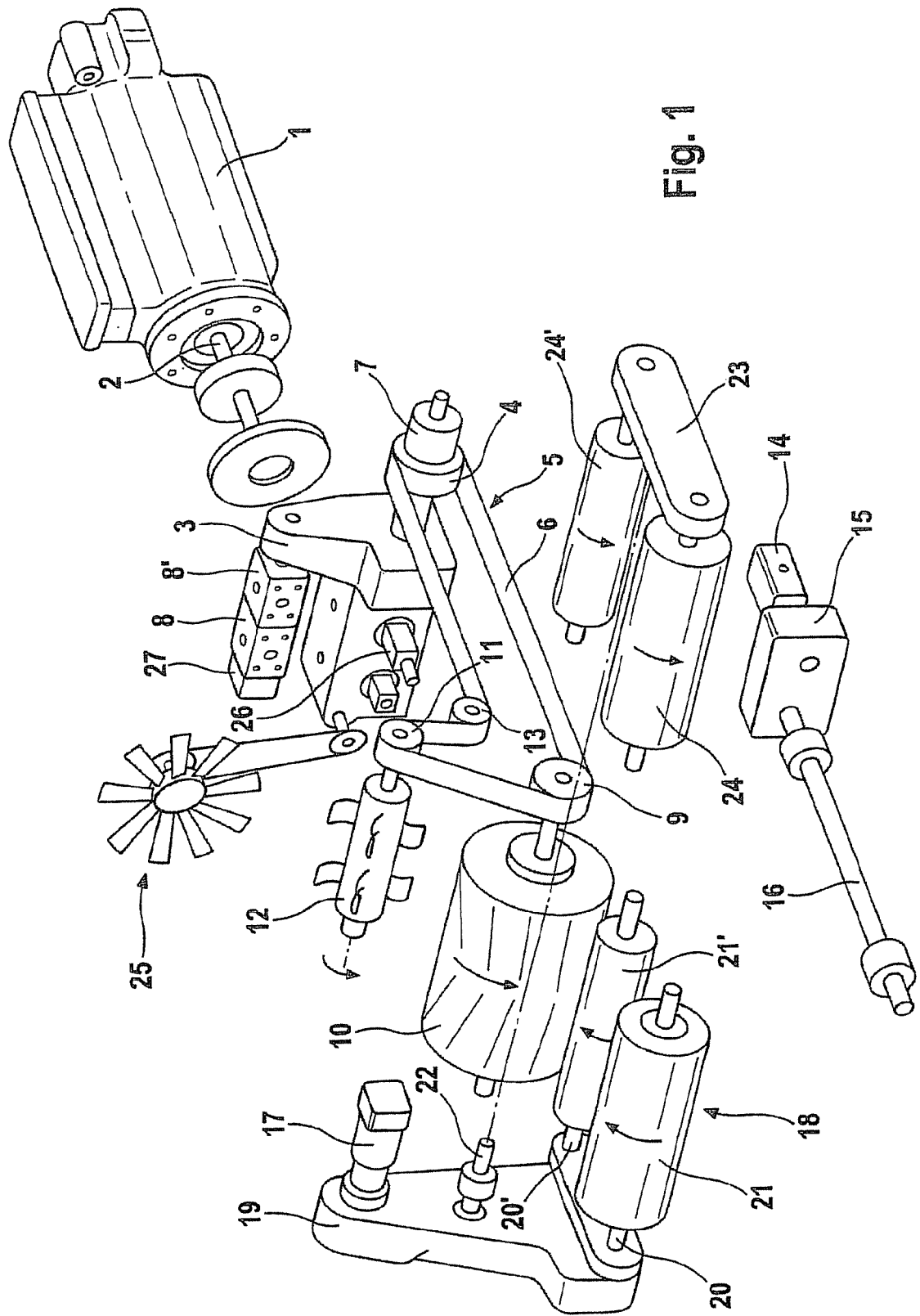
FIG. 1 is a perspective exploded view of a drive arrangement of a field chopper.

FIG. 1 is a perspective exploded view of a drive of a field chopper. The drive includes a drive motor 1 in the form of an internal combustion engine. The drive motor 1 is drivingly connected, via a crankshaft 2, to the motor driven gearbox 3. The motor driven gearbox 3 is formed as a transfer case. It drives a belt pulley 4 which, in turn, drives a belt drive 5 and a belt 6. The drive belt pulley 4 can selectively be separated from or connected to the drive of the motor driven gearbox 3 by a release clutch 7. Thus, when the drive motor 1 is operating, the belt drive 5 can be switched off. Furthermore, via the release clutch 7, a first hydraulic pump 8 is selectively switched on or off. A drive shaft for driving the first hydraulic pump 8 is drivingly connected to the drive belt pulley 4. They can be non-rotationally connected to each other.

The belt drive 5 further includes a first output belt pulley 9 to drive a chopper drum 10. The chopper drum 10 shreds a flow of harvested goods. The flow of harvested goods is transported by the chopper drum 10 to an acceleration drum 12. The harvested goods are delivered from the acceleration drum 12 to an ejection channel, not shown here. The acceleration drum 12 is driven via a second output belt pulley 11 of the belt drive 5. In the present case, the second output belt pulley 11 is at the loose side of a belt drive 5 between the drive belt pulley 4 and the first output belt pulley 9. On the loose side, when seen in a moving direction of the belt 6, a belt tensioning device 13 is arranged to tension the belt 6. It is arranged in front of the second output belt pulley 11. This arrangement with the release clutch 7 enables the chopper drum 10 and the acceleration drum 12 to optionally be separated from or connected to the drive of the drive motor 1 or the motor driven gearbox 3.

The first hydraulic pump 8 is connected, via hydraulic lines, not shown here, to a first hydraulic motor 14. The first hydraulic pump 8 drives the hydraulic motor 14. The first hydraulic motor 14 is drivingly connected to a gearbox 15. The gearbox 15 is at the driven-end of the hydraulic motor 14 and is connected to a drive shaft arrangement 16 to drive a header, not shown here, such as a pick-up and/or a transversal conveyor.

The first hydraulic pump 8 can be separated, via the same release clutch 7, from the motor driven gearbox 3. The drive belt pulley 4 of the belt drive 5 ensures that when the belt drive 5 is switched off, the first hydraulic pump 8 is also switched off. Thus, the hydraulic pump 8 is not driven by the motor driven gearbox 3 or by the drive motor 1. Thus, when the main working aggregate, namely the chopper unit, is switched off, it is ensured that hydraulic pumps are not used and do not idle and thus do not consume energy.

The first hydraulic pump 8 is connected to a further first hydraulic pump 8'. In the present case, two first hydraulic pumps 8, 8' are arranged directly behind one another. Generally, however, it may be considered, that a single first hydraulic pump is used. The further first hydraulic pump 8' is connected to a second hydraulic motor 17 to drive an intake unit 18. However, it is also conceivable, that the two first hydraulic pumps 8, 8' drive, in a common hydraulic circuit, the first hydraulic motor 14 and the second hydraulic motor 17. In the present case, the second hydraulic motor 17 is connected, via not shown hydraulic lines, to the other first hydraulic pump 8' and is driven by the same. The second hydraulic motor 17 is drivingly connected to a first intake gearbox 19. The first intake gearbox 19 has several output shafts 20, 20'. The output shafts 20, 20', respectively, are each drivingly connected to a lower feed roller 21, 21' and rotatingly drive them. Via a drive shaft 22, the first intake gearbox 19 is also connected to a second intake gearbox 23. Upper feed rollers 24, 24' are rotatingly driven by the second intake gearbox 23. The intake unit 18 serves to deliver a flow of harvested goods to the chopper drum 10. Thus, one lower feed roller 21, 21' and one upper feed roller 24, 24' are arranged, respectively, in pairs and are driven in opposite directions of rotation.

In this case, the belt drive 5 is switched off, it is ensured that the intake unit 18 is switched off and that the first hydraulic pump 8', necessary for this, does not idle.

Besides a drive arrangement 25 for a fan, a second hydraulic pump 26 is driven via the motor driven gearbox 3. The second hydraulic pump 26 serves as an auxiliary drive, for example, for the general on-board hydraulic system. The second hydraulic pump 26 can be connected, via hydraulic lines, not shown here, and via a control valve arrangement 27 to the first hydraulic pump 8. Thus, when the clutch 7 is released and the hydraulic connection between the first hydraulic pump 8 and the first hydraulic motor 14 is interrupted, the first hydraulic pump 8 is operated as a hydraulic motor. When the release clutch 7 is released, the second hydraulic pump 26, which is also driven by the motor driven gearbox 3, drives the first hydraulic pump 8.

When the release clutch 7 is released, the first hydraulic pump 8 is drivingly connected to the drive belt pulley 4. The drive belt pulley 4 can thus be fully driven hydrostatically. Preferably, the drive belt pulley 4 is driven by the drive motor 1 rotatingly in a main driving direction of rotation. In FIG. 1, the bottom of the belt is the driving side and at the top, the loose side of the belt drive is shown. When the first hydraulic pump 8 is operated as a hydraulic motor, it is driven by the second hydraulic pump 26. Thus, the belt drive 5 is operated in a rotational direction opposite to the main driving direction of rotation. Thus, the loose side of the belt drive 5 becomes the driving side and the driving side becomes the loose side. The chopper drum 10 is, thus, driven in the opposite direction. This is the case when the release clutch 7 is engaged and the belt drive 5 is driven by the drive motor 1 via the motor driven gearbox 3. In some applications, this can be of advantage, such as, for sharpening the blades of the chopper drum 10.

Figure 2:
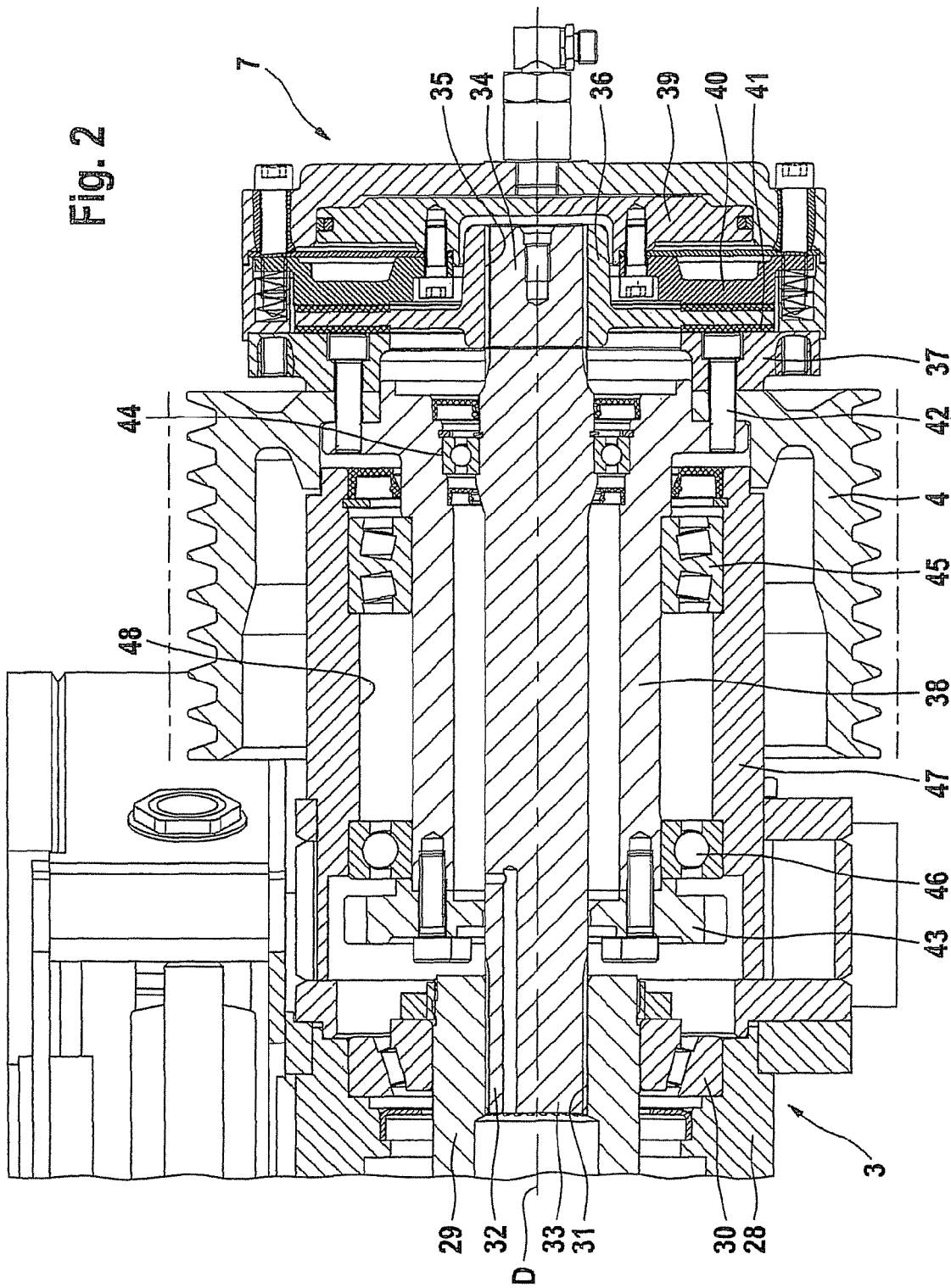
FIG. 2 is a partial longitudinal sectional view of the motor driven gearbox in the area of the belt pulley.

FIG. 2 shows a detail of the motor driven gearbox 3 in a longitudinal sectional view. An output shaft 29 is supported around a rotational axis D in a gearbox housing 28 of the motor driven gearbox 3. In FIG. 2, the output shaft 29 is supported by a roller member bearing 30. At another end of the drive shaft 29, it is also supported, via a rolling member bearing, in the gearbox housing 28. The drive shaft 29 is formed as a hollow shaft. It has a bore 31 with longitudinal teeth at an end projecting from the gearbox housing 28. The bore 31 receives longitudinal teeth of an inserted first end 33 of a stub shaft 32. The longitudinal teeth corresponds to the longitudinal teeth of the bore 31.

The stub shaft 32 is also provided with a second shaft end 34, distanced to the first shaft end 33. The outside of the second shaft end 34 includes longitudinal teeth that are inserted into a bore 35 of a first clutch element 36 of the release clutch 7. The second end 34 is connected rotationally fast to the clutch element 36. The rotationally fast connection of the bore 35 to the first clutch element 36 is accomplished by corresponding longitudinal teeth.

The first clutch element 36 is formed as a friction disc and is held in frictional contact to a second clutch element 37. A piston 39 can be acted upon either hydraulically or pneumatically, via a pressure plate 40, to push the first clutch element 36 against a friction face 41 of the second clutch element 37. When the piston is pressurized, a rotationally fast connection is produced between the first clutch element 36 and the second clutch element 37. If the piston 39 is not operated, the first clutch element 36 and the second clutch element 37 can rotate relative to each other.

The second clutch element 37 is non-rotationally connected via connection screws 42, to the drive belt pulley 4. The drive belt pulley 4 is in the form of a V-belt pulley. A hollow shaft 38 is non-rotationally connected to the second clutch element 37 via the connection screws 42. A toothed wheel 43 is non-rotationally connected to the hollow shaft 38 at an end facing away from the release clutch 7. The first hydraulic pump, which in the present representation is not shown, is driven via the toothed wheel 34. Thus, via the second clutch element 37, the drive belt pulley 4 and the first hydraulic pump 8 are driven.

The hollow shaft 38 is supported via a ball bearing 44 on the stub shaft 32. The hollow shaft 38 is supported via a swivel rolling member bearing 45 and a ball bearing 46 in a bearing bore 48 of a sleeve-like bearing portion 47. The bearing portion 47 is attached in a fast manner to the gearbox housing 28.

In the shown arrangement, when the drive motor is running and when the output shaft 29 of the motor driven gearbox 3 is rotating, the drive belt pulley 4 can be selectively switched on or off to drive the first hydraulic pump 8. It is further obvious, that, when the release clutch 7 is released, the first hydraulic pump 8 can be operated as a hydraulic motor and, thus, drive the drive belt pulley 4.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A drive arrangement for an agricultural machine, comprising:
    a motor driven gearbox connectable at a drive-end to at least one drive motor;
    at least one first hydraulic pump for feeding at least one hydraulic motor to drive a working mechanism of a machine;
    a belt pulley of a belt drive for driving a chopper drum;
    a release clutch with an input-sided first clutch element and an output-sided second clutch element, the first clutch element is drivingly connected to the motor driven gearbox, the second clutch element is drivingly connected to the belt pulley; and
    a drive shaft non-rotationally connected to the second clutch element, said drive shaft drives the at least one first hydraulic pump.

2. The drive arrangement according to claim 1, wherein the motor driven gearbox has an output shaft that is non-rotationally connected to the first clutch element.

3. The drive arrangement according to claim 1, wherein the second clutch element is non-rotationally connected to the belt pulley.

4. The drive arrangement according to claim 1, wherein a control valve arrangement is provided, via the at least one first hydraulic pump and is connected to the at least one hydraulic motor.

5. The drive arrangement according to claim 1, further comprising at least one second hydraulic pump connected via a control valve arrangement to the at least one first hydraulic pump, in a first switching position of the control valve arrangement, with the release clutch engaged, the at least one first hydraulic pump and the at least one second hydraulic pump are hydraulically separated from each other, and the at least one first hydraulic pump and the belt pulley are driven by the at least one drive motor in a main direction of rotation, in a second switching position of the control valve arrangement, when the release clutch is released, the at least one first hydraulic pump is hydraulically connected to the at least one second hydraulic pump such that the at least one first hydraulic pump is operated for driving the belt pulley and is driven by the at least one second hydraulic pump in a direction of rotation opposite to the main rotational direction.

6. The drive arrangement according to claim 1, wherein the working mechanism comprises a header for picking-up and transporting harvested goods.

7. The drive arrangement according to claim 1, wherein the motor driven gearbox has a gearbox housing that mounts the at least one first hydraulic pump.

\* \* \* \* \*